(12) United States Patent
Felser et al.

(10) Patent No.: US 12,505,857 B2
(45) Date of Patent: Dec. 23, 2025

(54) MAGNETIC BUBBLE MEMORY FROM 4F LANTHANIDE AND FERROMAGNETIC TYPE MATERIALS

(71) Applicant: Max Planck Gesellschaft zur Förderung der Wissenschaften eV, Munich (DE)

(72) Inventors: Claudia Felser, Halle (DE); Yangkun He, Dresden (DE)

(73) Assignee: MAX PLANCK GESELLSCHAFT ZUR FÖRDERUNG DER WISSENSCHAFTEN EV, Munich (DE)

( * ) Notice: Subject to any disclaimer, the term of this patent is extended or adjusted under 35 U.S.C. 154(b) by 291 days.

(21) Appl. No.: 18/253,546

(22) PCT Filed: Nov. 18, 2021

(86) PCT No.: PCT/EP2021/082133
§ 371 (c)(1),
(2) Date: May 18, 2023

(87) PCT Pub. No.: WO2022/106535
PCT Pub. Date: May 27, 2022

(65) Prior Publication Data
US 2024/0046960 A1 Feb. 8, 2024

(30) Foreign Application Priority Data
Nov. 20, 2020 (EP) .................................. 20208797

(51) Int. Cl.
G11B 5/49 (2006.01)
G11C 11/16 (2006.01)
(Continued)

(52) U.S. Cl.
CPC .......... G11B 5/4946 (2013.01); G11C 11/161 (2013.01); H01F 10/123 (2013.01); H01F 10/126 (2013.01); H01F 41/301 (2013.01)

(58) Field of Classification Search
CPC . G11B 5/4946; G11C 11/161; G11C 11/1675; H01F 10/123; H01F 10/126;
(Continued)

(56) References Cited

U.S. PATENT DOCUMENTS

| 7,767,627 B1 * | 8/2010 | Goldwasser | ........... B82Y 25/00 |
| | | | 506/3 |
| 2004/0144449 A1 * | 7/2004 | Shimada | ............. H01F 41/0273 |
| | | | 148/105 |
| 2018/0240972 A1 * | 8/2018 | Gilbert | ................ H01F 10/3286 |

FOREIGN PATENT DOCUMENTS

| CN | 110911085 A * | 1/2021 | ........... H01F 10/126 |
| EP | 0 035 622 A1 | 9/1981 | |

OTHER PUBLICATIONS

International Search Report or PCT/EP2021/082133, filed Nov. 18, 2021.
(Continued)

*Primary Examiner* — Donald HB Braswell
(74) *Attorney, Agent, or Firm* — ProPat, LLC; Cathy R. Moore

(57) ABSTRACT

The present invention relates to a metallic hard magnetic material selected from an at least binary ferromagnetic or ferrimagnetic compound, with the metallic hard magnetic material including at least two different elements selected from the group consisting of 3d and 4f elements, where the metallic hard magnetic material is under an external magnetic field B of $\geq 0.1$ T.

25 Claims, 5 Drawing Sheets

(51) Int. Cl.
  *H01F 10/12*   (2006.01)
  *H01F 41/30*   (2006.01)
(58) Field of Classification Search
  CPC .... H01F 41/301; H01F 10/1936; H01F 41/18; H01F 41/30
  See application file for complete search history.

(56) References Cited

OTHER PUBLICATIONS

International Report on Patentability for PCT/EP2021/082133, filed Nov. 18, 2021.
Sapozhnikov et al., "Artificial dense lattice of magnetic bubbles," Applied Physics Letters, vol. 109, No. 4, (2016), pp. 042406 1-5, abstract figures 1, 2.
Moutafis, et al. "Magnetic bubbles in FePt nanodots with perpendicular anisotropy," Physical Review B, Sep. 24, 2007, 76, 104426.
Zhu, et al. "Magnetic-domain structure of Nd2Fe14B permanent magnets," Journal of Applied Physics, 1998, vol. 84, pp. 3267-3272.
https://science.sciencemag.org/content/349/6245/283.abstract Jiang, et al., "Blowing magnetic skyrmion bubbles," Science, Jun. 11, 2015, vol. 349, Issue 6245, pp. 283-286.
https://en.wikipedia.org/wiki/Magnetocrystalline_anisotropy, retrieved from the internet on Jun. 6, 2023.
He et al., "A New Highly Anisotropic Rh-Based Heusler Compound for Magnetic Recording," Advanced Materials, vol. 32, No. 45, Oct. 7, 2020, p. 2004331. Retrieved from the Internet: https://onlinelibrary.wiley.com/doi/full-xml/10.1002/adma.202004331.
Jourdan et al., "Magnetic bubbles in FePd thin films near saturation," Journal of Applied Physics, vol. 106, No. 7, Oct. 13, 2009, p. 73913.

* cited by examiner

MAGNETIC BUBBLE MEMORY FROM 4F LANTHANIDE AND FERROMAGNETIC TYPE MATERIALS

CROSS-REFERENCE TO RELATED APPLICATIONS

This application is being filed under 35 U.S.C. § 371 as a National Stage Application of pending International Application No. PCT/EP2021/082133 filed Nov. 18, 2021, which claims priority to the following parent application: European Patent Application No. 20208797.9, filed Nov. 20, 2020. Both International Application No. PCT/EP2021/082133 and European Patent Application No. 20208797.9 are hereby incorporated by reference herein in their entirety.

FIELD OF THE INVENTION

The present invention pertains to computer memory material, specifically hard magnetic material comprising magnetic bubbles. More particularly, the present invention pertains to non-oxide hard magnetic material exhibiting small magnetic bubbles by applying an external magnetic field.

BACKGROUND

Magnetic bubbles are tiny movable magnetized cylindrical volumes in a thin magnetic material with uniaxial magnetocrystalline anisotropy ($K_u$) (see en.wikipedia.org/wiki/Magnetocrystalline_anisotropy). The bubbles extend through the whole thickness of the sample. Magnetic bubbles were heavily studied in the 1960s to 1970s for computer data storage.

In the past these materials were mainly oxides including rare-earth iron Garnets $R_3Fe_5O_{12}$ (R being a rare earth element), Orthoferrites $RFeO_3$ (R being a rare earth element), Hexagonal ferrites $MFe_{12-x}A_xO_{19}$ (M=Ba, Ca, Sr, or Pb and A=Al or Ga). These materials exhibit magnetic bubbles with a diameter of larger than 1 μm. Unfortunately, due to the large size, this kind of bubble memory lost the competition against semiconductor memory. Smaller bubbles are needed for commercial applications.

In order to stabilize the magnetic bubble, $K_u$ must be large enough (preferably $K_u \geq 0.5$ MJm$^{-3}$ at 300 K) to resist the demagnetization energy. In other words, the magnetic hardness parameter κ (defined as $\kappa = \sqrt{K_u/(\mu_0 M_s^2)}$, where $M_s$ is the spontaneous saturation and $\mu_0$ is the permeability of free space), should satisfy the condition of $\kappa > \sqrt{2}/2$.

Metallic hard magnets, such as $Nd_2Fe_{14}B$ and Sm—Co, which are widely used in daily life, exhibit a κ of larger than 1. Therefore, these hard magnets already satisfy a main requirement for the existence of magnetic bubbles.

Yet, for computer memory applications, the size of the magnetic bubbles in these known hard magnets with their large $K_u$ must be much smaller than 1 μm.

Thus, a commercial successful magnetic bubble material should exhibit both, a small bubble size of below 1 μm and a κ of $>\sqrt{2}/2$.

Yimei Zhu, and M. R. McCartney (Journal of Applied Physics, 1998, 84, 3267) studied the domain structure of $Nd_2Fe_{14}B$ in thin lamella by Lorentz transmission electron microscopy (LTEM) without applying magnetic field and observed stripe domains. No magnetic bubbles were found at zero magnetic field.

C. Moutafis, S. Komineas, C. A. F. Vaz, J. A. C. Bland, T. Shima, T. Seki, and K. Takanashi (Physical Review B, 2007, 76, 104426) reported magnetic bubbles in FePt samples of nano-size with perpendicular anisotropy.

OBJECT OF THE INVENTION

It was an object of the present invention to provide hard magnetic materials which exhibit a small bubble size of below 1 μm and a κ of $>\sqrt{2}/2$.

BRIEF DESCRIPTION OF THE INVENTION

The present inventors found that by applying an external magnetic field with a field direction component perpendicular to the surface plane of a thin lamella or film of a metallic hard magnetic material selected from at least binary ferromagnetic and ferrimagnetic compounds comprising elements from the group consisting of 3d and/or 4f elements, the magnetic domain structure changes from stripe domain to magnetic bubbles before magnetic saturation.

Accordingly, the invention relates to a defined hard magnetic material under an external out of plane magnetic field, preferably under an external magnetic field B of $0.1 T \leq B \leq 2 T$ in an out of plane direction.

DETAILED DESCRIPTION OF THE INVENTION

The hard magnetic material which is capable of forming magnetic bubbles with a diameter of below 1 μm, preferably ≤500 nm, more preferred ≤100 nm, can be selected from preferably at least binary ferromagnetic and ferrimagnetic compounds comprising elements from the group consisting of 3d and/or 4f elements with a magnetic hardness parameter κ of larger than $\sqrt{2}/2$, preferably ≥0.9, more preferred ≥1, and a Curie temperature of higher than 300 K, preferably ≥500 K, more preferred ≥600 K and a $K_u$ of ≥0.5 MJm$^{-3}$, preferably ≥0.7 MJm$^{-3}$, more preferred ≥1 MJm$^{-3}$ at 300 K. Hard magnetic compounds meeting this requirement may be selected from the group consisting of:

$R_2Y_{14}B$, wherein
  R is rare earth element, and
  Y=Fe, Co, $RCo_5$, wherein
  R is a rare earth element, $RCo_4B$, wherein
  R is a rare earth element, $R_2Y_{17}Z_x$, wherein
  R is a rare earth element,
  Y=Fe and Co,
  Z=C, B, N or H, and
  x≥0, $RY_{12-x}Z_xX_y$, wherein
  R is a rare earth element,
  Y=Mn, Fe, Co, Z=Ti, V,
x≥0,
X=C, B, N or H, and
y≥0,
X$_2$YZ, wherein
X=Rh, Ru, Pd, Ir or Pt,
Y=Cr, Mn, Fe, Co or Ni,
Z=Al, Ga, In, Tl, Ge, Sn, Pb, As, Sb or Bi,
Mn$_{1+x}$Z, wherein
0≤x≤2, and
Z=Ga, Al or Bi,
FePd, and
CoPt.

In these compounds, the magnetic hardness parameter is ≥√2/2, preferably ≥0.9, more preferred ≥1, and a Curie temperature of higher than 300 K, preferably ≥500 K, more preferred ≥600 K and a K$_u$ of ≥0.5 MJm$^{-3}$, preferably ≥0.7 MJm$^{-3}$, more preferred ≥1 MJm$^{-3}$ at 300 K.

Figure 1:
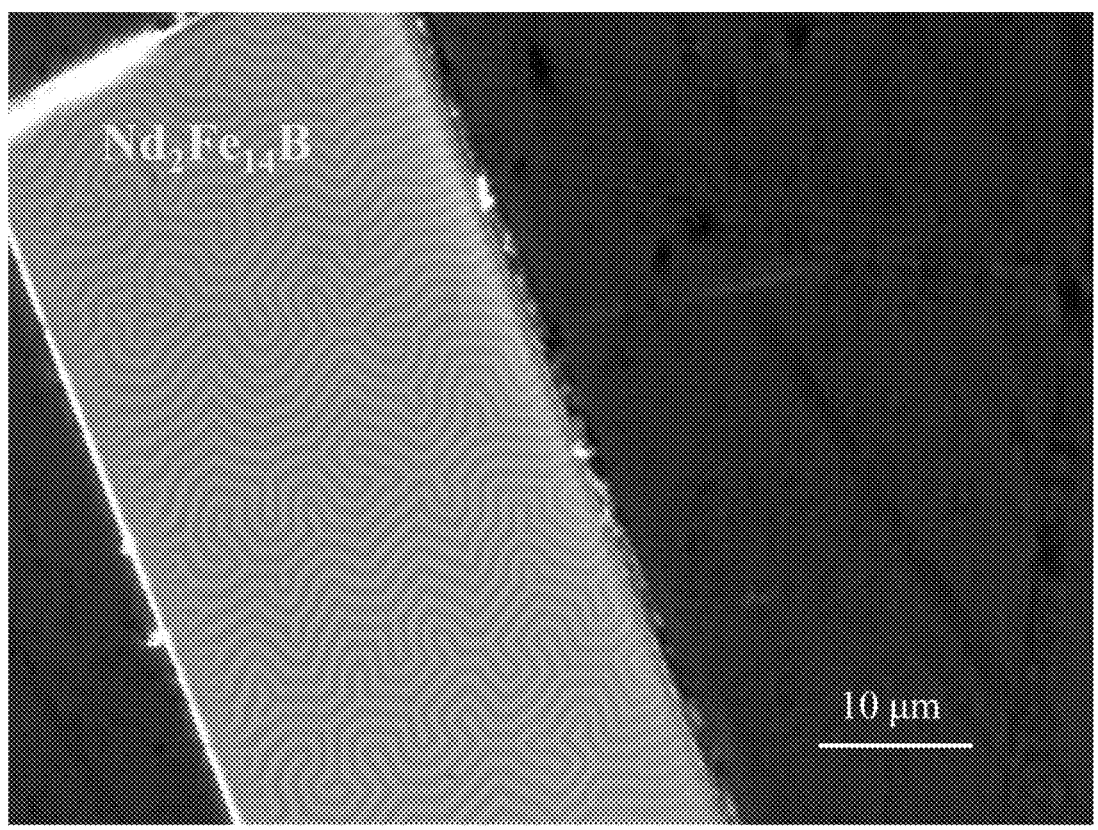
FIG. 1 shows the stripe domain structure in $Nd_2Fe_{14}B$ at 300 K without magnetic field.

The ground domain state at zero external magnetic field in these compounds is represented by stripe domains (see FIG. 1). A stripe domain is a ribbon-like structure, where the inside of the domain is delineated from the outside by a domain wall of less than 100 nm thickness, preferably ≤50 nm thickness, more preferably ≤10 nm thickness. The inside of the domain exhibits a domain pattern of magnetic moments which all point in the out-of-plane direction and the domain wall has a band-like shape (see FIG. 1). The stripe domains extend through the whole thickness of the sample. Yet, under an applied magnetic field, which has a component which is directed parallel to the easy axis of the magnetic compound, the domain which exhibits magnetic moments which are directed parallel to the applied field becomes wider and the domain in the opposite direction to the magnetic field shrinks. With further increasing field strength, the stripe domains then break into individual bubbles, which—under further increasing field strength—decrease in diameter and then collapse and disappear. The moment direction outside the bubbles is parallel to the applied magnetic field, while the core inside the bubbles has magnetic moment antiparallel to the applied magnetic field. The domain wall itself is either of Bloch type or Neel type.

The easy axis is an energetically favorable direction of spontaneous magnetization (see en.wikipedia.org/wiki/Magnetocrystalline an-isotropy). "Applying an external magnetic field" means in the proximity of a permanent or electromagnet, such that the hard magnetic material experiences a constant magnetic field of the indicated magnitude, which is larger than the magnetic field of the earth (which has a magnitude of about 25 to 65 µT). The magnet can be a permanent magnet or an electromagnet. The magnetic field strength B needed for maintaining magnetic bubbles depends on the intrinsic magnetic properties like magnetocrystalline anisotropy, saturation magnetization and on extrinsic parameters like the sample thickness. Thus, the field strength B needed for obtaining and maintaining magnetic bubbles is strongly related to the kind of material as well as the thickness of the lamella. Generally speaking, the harder magnetic the material and the thinner the sample and the larger the saturation magnetization, the higher the required field strength.

For the hard magnetic material according to the present invention the field strength B needed for obtaining and maintaining magnetic bubbles is ≥0.1 T, preferably 0.1 T≤B≤2 T, and more preferred 0.1 T≤B≤1 T. An increase of the minimum field strength B$_{min}$ (0.1 T) to the maximum field strength B$_{max}$ of 2 T, preferably 1 T, results in a shrinking of the bubbles to a diameter of less than preferably ≤500 nm, to ≤100 nm or even ≤50 nm. The minimum field strength B$_{min}$ can roughly be calculated from M$_s$ of the hard magnetic material used and µ$_0$:0.4µ$_0$M$_s$≤B$_{min}$<µ$_0$M$_s$ (M$_s$ is the saturation magnetization of the hard magnetic material, and to is the permeability of free space).

As stated above, in order to create and maintain magnetic bubbles the direction of the applied magnetic field should exhibit a component, which is pointing out of the plane, which is normal to the easy axis of the hard magnetic compound, typically pointing out of the crystallographic ab plane of the hard magnetic compound. The angle between the field direction and the easy axis, preferably the crystallographic c axis, is ≤30°, preferably ≤10° and more preferred ≤1°. Since it is preferred to design the hard magnetic material in the form of a thin lamella or film, with a surface plane which corresponds to or is at least close to (meaning ±10%, preferably ±5%, most preferred ±1%) the crystallographic ab plane, also the angle between the crystallographic c axis and the perpendicular direction to surface plane of the thin lamella or film is ≤30°, preferably ≤10° and more preferred ≤1°.

The thin lamellae or films of hard magnetic material according to the present invention have a thickness of ≤10 µm, preferably ≤2 µm and more preferred ≤0.2 µm. The length and width of the thin lamella or films is not critical but it is preferred that the ratio between the length or width and thickness is ≥10, preferably ≥200 and more preferred ≥500. Typically, the width is ≥0.01 mm, preferably 0.1-10 mm, more preferred 1-10 mm and also the length is ≥0.01 mm, preferably 0.1-10 mm, more preferred 1-10 mm.

When the magnetic field strength is continuously increased beyond the field strength for stabilized magnetic bubbles (B≥0.1 T, preferably 0.1 T≤B≤2 T and more preferred 0.1 T≤B≤1 T) the diameter of the bubbles shrinks with increasing magnetic field until they collapse and disappear. The diameter when bubbles collapse is called the minimum diameter. The minimum diameter for magnetic bubbles, which can be achieved by increasing the field strength is ≤500 nm, preferably ≤200 nm, more preferred ≤100 nm and most preferred ≤50 nm.

The lamellae according to the present invention can be prepared from single-crystalline grains of polycrystalline bulk material or direct from single crystalline bulk samples of preferably binary ferromagnetic and ferrimagnetic compounds comprising elements from the group consisting of 3d and/or 4f elements.

Initially polycrystalline ingots of these compounds are prepared, e.g. by arc-melting methods. Single crystalline bulk material can be prepared by e.g. the Bridgeman method and flux method. Subsequently, lamellae can e.g. be lifted out of the polycrystalline material or single crystalline bulk material e.g. in a NANO LAB® dual beam system that has both a scanning electron microscope (SEM) and a focused ion beam (FIB) equipped with a gas injection system (GIS) and a micromanipulator (Oxford OMNIPROBE® 200+). Such a dual beam system is available e.g. at FEI Company (Hillsboro, Oregon, U.S.A.).

The film according to the present invention can be prepared from e.g. Molecular-beam epitaxy or sputtering methods on a substrate of e.g. MgO, Al$_2$O$_3$, Si, SiO$_2$.

The lamellae or films are cut out so that they have
a thickness of ≤10 µm, preferably ≤2 µm, more preferred ≤0.2 µm;
a width of ≥0.01 mm, preferably 0.1-10 mm, more preferred 1-10 mm and
a length of ≥0.01 mm, preferably 0.1-10 mm, more preferred 1-10 mm.

The thin lamellae or films of metallic hard magnets under magnetic field of the present invention can be used as magnetic bubble materials for computer data storage. The magnetic bubbles can e.g. move along with an in-plane current at very high velocity (see science.sciencemag.org/content/349/6245/283.abstract). Locations on the thin lamellae or films with/without bubbles can be regard as 0/1 bits for magnetic memory. Accordingly, the invention also comprises a computer data storage device comprising the above-described metallic hard magnetic material.

EXAMPLES

The invention is explained in more detail below with reference to examples on a single crystal of $Nd_2Fe_{14}B$ at 300 K with the thickness of 100 nm.

The magnetic domain structure is stripe domain without magnetic field. The magnetic field is applied along c axis. The domain structure remains as stripe domain below 0.80 T. From T to 0.94 T, the stripe domain breaks into magnetic bubbles. During this field range, the stripe domain and bubbles coexist. From 0.94 T to 1.2 T, there are only individual bubbles without stripe domains. The saturation magnetic field is 1.2 T, above which there is a single domain. Under 0.94 T, the diameter is 250 nm. The minimum diameter of the bubble at 1.2 T is 100 nm. The magnetic field $B_{min}$ that is required to be applied permanently to maintain the bubble is $0.4\mu_0 M_s \leq B_{min} < \mu_0 M_s$ ($M_s$ is the saturation magnetization and $\mu_0$ is the permeability of free space). The bubbles have their smallest diameter shortly before they suddenly disappear with further increasing magnetic field.

FIG. 1 shows the stripe domain structure in $Nd_2Fe_{14}B$ at 300 K without magnetic field. The $Nd_2Fe_{14}B$ thin lamella is a single crystal with the thickness of 2 μm. The image was obtained by Kerr microscopy. The out-of-plane direction here is the c axis. The stripe domains are dark and light in the Kerr microscopy images. The moment directions in the dark and light stripe domains are in the opposite directions parallel or antiparallel to the c axis of the crystal.

Figure 2:
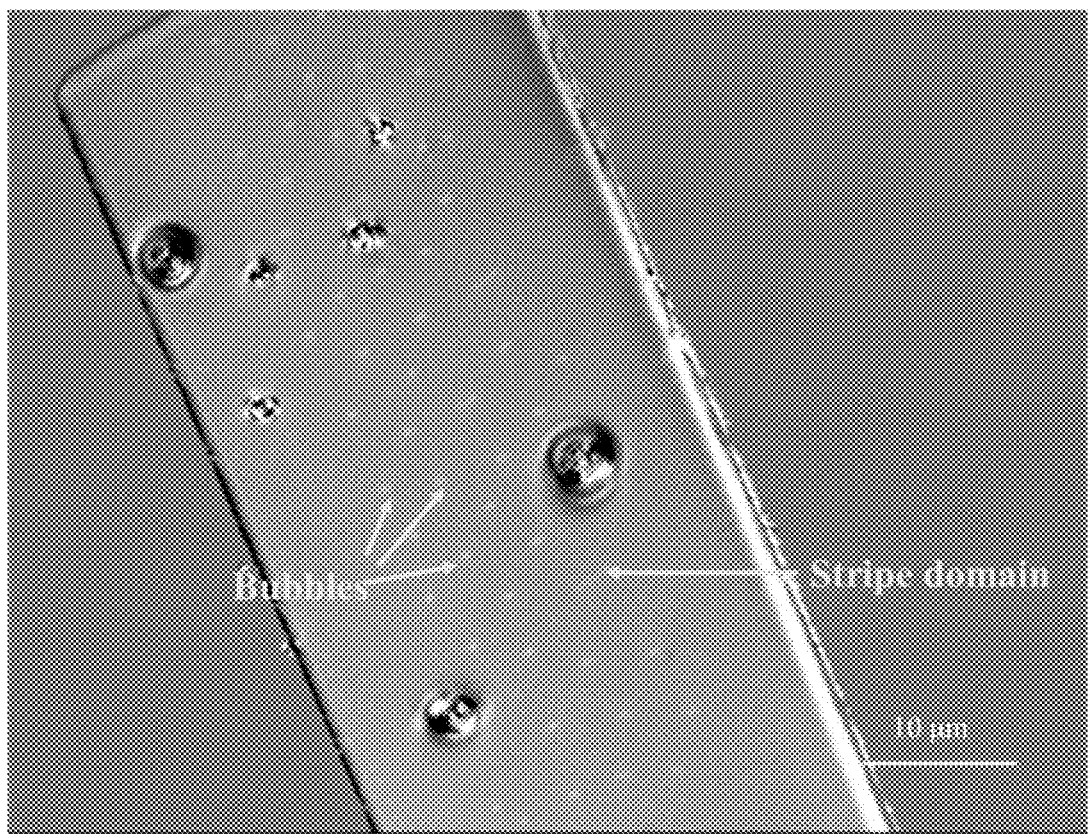
FIG. 2 shows the magnetic bubbles in $Nd_2Fe_{14}B$ at 300 K under an applied magnetic field of 1.04 T.

FIG. 2 shows the magnetic bubble in $Nd_2Fe_{14}B$ at 300 K under applied magnetic field of 1.04 T. The $Nd_2Fe_{14}B$ thin lamella is a single crystal with the thickness of 2 μm. The image was obtained by Kerr microscopy. By applying a magnetic field along the c axis or with a c axis component, the stripe domains with the moment parallel to the field direction expand and those with the opposite sign of the field shrink. Beyond 0.8 T the shrunk stripe domains antiparallel to the magnetic field break into individual bubbles, as shown in FIG. 2.

Figure 3:
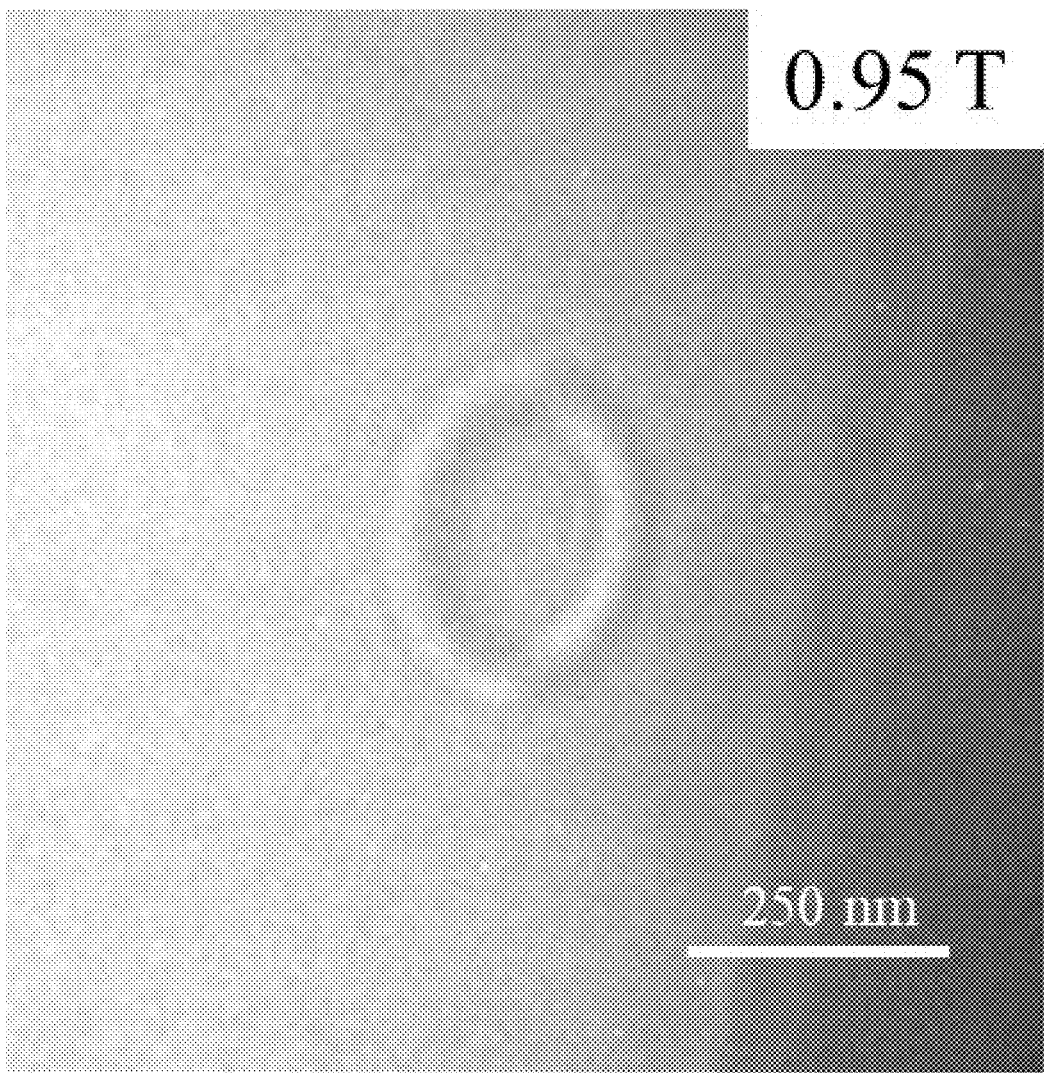
FIG. 3 shows a bubble in $Nd_2Fe_{14}B$ at 300 K under an applied magnetic field of 0.95 T.

FIG. 3 shows the bubble in $Nd_2Fe_{14}B$ at 300 K under an applied magnetic field of T. The image was obtained by LTEM in a thin lamella of 100 nm thickness. The bubble diameter is about 250 nm.

Figure 4:
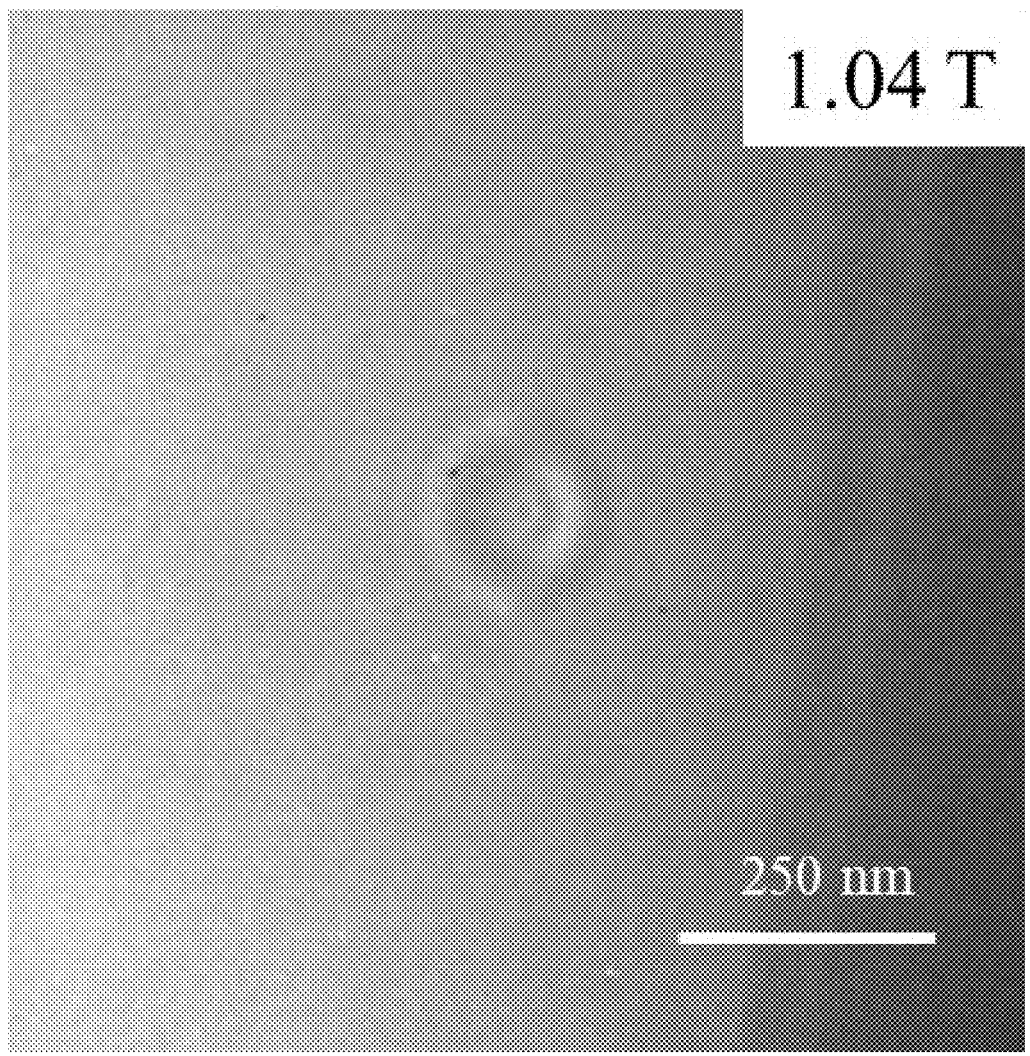
FIG. 4 shows the bubble in $Nd_2Fe_{14}B$ at 300 K under an applied magnetic field of 1.04 T.

FIG. 4 shows the bubble in in $Nd_2Fe_{14}B$ at 300 K under an applied magnetic field of T. The image was obtained by LTEM in a thin lamella of 100 nm thickness. The bubble diameter is about 160 nm.

The magnetic bubbles shrink with increasing magnetic field as shown in FIG. 3 and FIG. 4. Finally, the bubbles collapse and disappear, as the result of which the material is saturated. The diameter when bubbles collapse is called the minimum diameter.

Figure 5:
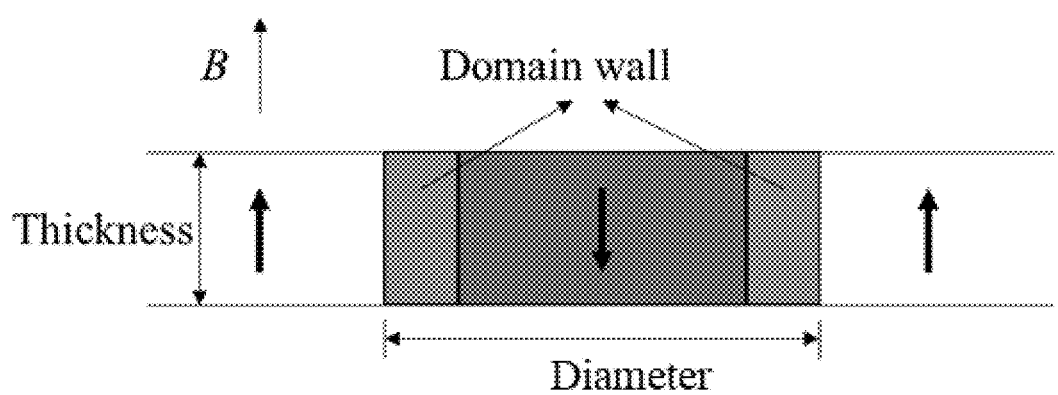
FIG. 5 shows the magnetic structure of a bubble from the side.

FIG. 5 shows the bubble spin structure from the side view. The magnetic field is pointing out of the ab plane. The magnetic structure of the bubble from the side view is shown in FIG. 5. The bubble goes through the whole material. The domain wall, which separate the inside uniformly magnetized core of the bubble and the outside domain, can be both of Neel and of Bloch type. The moment direction outside the bubble is parallel to the applied magnetic field, while the core inside the bubble has magnetic moment antiparallel to the applied magnetic field.

The invention claimed is:

1. A metallic hard magnetic material, selected from an at least binary ferromagnetic or ferrimagnetic compound, comprising at least two different elements selected from the group consisting of 3d and 4f elements, wherein the metallic hard magnetic material is under an external magnetic field B of >0.1 T, and said metallic hard magnetic material exhibits a magnetic hardness parameter x of larger than .squareroot.2/2, and a Curie temperature of higher than 300 K, and a K.sub.u of >0.5 MJn3 at 300 K, where K.sub.u is the material's uniaxial magnetocrystalline anisotropy.

2. A computer data storage device comprising a metallic hard magnetic material according to claim 1.

3. The metallic hard magnetic material according to claim 1, said metallic hard magnetic material exhibiting at least one magnetic bubble with a diameter of below 1 μm.

4. The metallic hard magnetic material according to claim 1, wherein the metallic hard magnetic material has the form of a lamella or film with a
a thickness t of ≤10 μm;
a width w of ≥0.01 mm and
a length l of ≥0.01 mm.

5. The metallic hard magnetic material according to claim 4, wherein the width w and the length l form a plane which coincides with or is close to a crystallographic ab plane of the material.

6. The metallic hard magnetic material according to claim 5, wherein an angle between a crystallographic c axis of the material and a normal of a surface plane of the lamella or film is ≤30°.

7. The metallic hard magnetic material according to claim 5, wherein the field B has a direction component which is perpendicular to a crystallographic ab plane of the metallic hard magnetic material.

8. The metallic hard magnetic material according to claim 7, wherein an angle between a direction of the field B and an easy axis of the material is ≤30°.

9. The metallic hard magnetic material according to claim 8, where the easy axis of the material is the crystallographic c axis of the material.

10. The metallic hard magnetic material according to claim 1, wherein the hard magnetic material is selected from the group consisting of:
$R_2Y_{14}B$, wherein
R is rare earth element, and
Y=Fe, Co,
$RCo_5$, wherein
R is a rare earth element,
$RCo_4B$, wherein
R is a rare earth element,
$R_2Y_{17}Z_x$, wherein
R is a rare earth element,
Y=Fe and Co,
Z=C, B, N or H, and
x≥0,
$RY_{12-x}Z_xX_y$, wherein
R is a rare earth element,
Y=Mn, Fe, Co,
Z=Ti, V,
x≥0, X=C, B, N or H, and y≥0, $X_2YZ$, wherein X=Rh, Ru, Pd, Ir or Pt, Y=Cr, Mn, Fe, Co or Ni, Z=Al, Ga, In, Tl, Ge, Sn, Pb, As, Sb or Bi, $Mn_{1+x}Z$, wherein 0≤x≤2, and Z=Ga, Al or Bi, FePd, and CoPt.

11. The metallic hard magnetic material according to claim 1, wherein a minimum field strength $B_{min}$ needed for obtaining and maintaining magnetic bubbles is $0.4\mu_0 M_s \leq B_{min} < \mu_0 M_s$, where $M_s$ is the saturation magnetization of the hard magnetic material, and po is the permeability of free space.

12. A method of manufacturing the metallic hard magnetic material according to claim 1 comprising either forming the material into lamellae by either arc-melting mixtures of elements from the group consisting of 3d and/or 4f elements to yield polycrystalline ingots, or preparing single-crystalline grains by a Bridgeman method or flux method from mixtures of elements from the group consisting of 3d and/or 4f elements, or forming the material into a film and then subjecting the material to an external magnetic field B of ≥0.1 T.

13. The method according to claim 12, further comprising forming the film via molecular-beam epitaxy or sputtering methods on a substrate.

14. The method according to claim 12, wherein the substrate is MgO, $Al_2O_3$, Si or $SiO_2$.

15. A method of storing computer data comprising providing a metallic hard magnetic material according to claim 1 as magnetic bubble material for computer data storage.

16. A method of generating magnetic bubbles in a metallic hard magnetic material selected from an at least binary ferromagnetic or ferrimagnetic compound comprising selecting at least two different elements from the group consisting of 3d and 4f elements, forming a metallic hard magnetic material therefrom and subjecting the metallic hard magnetic material to an external magnetic field B of ≥0.1 T, wherein the metallic hard magnetic material exhibits a magnetic hardness parameter x of larger than .square-root.2/2, and a Curie temperature of higher than 300 K, and a K.sub.u of >0.5 MJm 3 at 300 K, where K.sub.u is the material's uniaxial magnetocrystalline anisotropy.

17. The method according to claim 16, wherein the magnetic bubbles have a diameter of below 1 μm.

18. The method according to claim 16, wherein the metallic hard magnetic material has the form of a lamella or film with a a thickness t of ≤10 μm;

a width w of ≥0.01 mm and a length l of ≥0.01 mm.

19. The method according to claim 18, wherein the width w and the length l form a surface plane which coincides with or is close to a crystallographic ab plane of the material.

20. The method according to claim 19, wherein an angle between a crystallographic c axis of the metallic hard magnetic material and a normal of the surface plane of the lamella or film is ≤30°.

21. The method according to claim 19, wherein the field B has a direction component which is perpendicular to the crystallographic ab plane of the metallic hard magnetic material.

22. The method according to claim 21, wherein an angle between the direction of the field B and an easy axis of the material is ≤30°.

23. The method according to claim 22, wherein the easy axis of the material is the crystallographic c axis of the material.

24. The method according to claim 16, wherein the hard magnetic material is selected from the group consisting of:

$R_2Y_{14}B$, wherein

R is rare earth element, and

Y=Fe, Co, $RCo_5$, wherein

R is a rare earth element, $RCo_4B$, wherein

R is a rare earth element, $R_2Y_{17}Z_x$, wherein

R is a rare earth element,

Y=Fe and Co,

Z=C, B, N or H, and x≥0, $RY_{12-x}Z_xX_y$, wherein

R is a rare earth element,

Y=Mn, Fe, Co,

Z=Ti, V, x≥0,

X=C, B, N or H, and y ≥0, $X_2YZ$, wherein

X=Rh, Ru, Pd, Ir or Pt,

Y=Cr, Mn, Fe, Co or Ni,

Z=Al, Ga, In, Tl, Ge, Sn, Pb, As, Sb or Bi, $Mn_{1+x}Z$, wherein

0≤x≤2, and

Z=Ga, Al or Bi,

FePd, and

CoPt.

25. The method according to claim 16, wherein a minimum external magnetic field strength $B_{min}$ needed for obtaining and maintaining magnetic bubbles is $0.4\mu_0 M_s \leq B_{min} < \mu_0 M_s$, where $M_s$ is the saturation magnetization of the hard magnetic material, and $\mu_0$ is the permeability of free space.

* * * * *